United States Patent
Haider et al.

(10) Patent No.: US 7,750,058 B2
(45) Date of Patent: *Jul. 6, 2010

(54) PROCESS FOR PREPARING CLOSED-CELL WATER-BLOWN RIGID POLYURETHANE FOAMS HAVING IMPROVED MECHANICAL PROPERTIES

(75) Inventors: Karl W. Haider, Hurricane, WV (US); Neil H. Nodelman, Upper St. Clair, PA (US); John P. Forsythe, Allison Park, PA (US); Brian R. Suddaby, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/241,146

(22) Filed: Sep. 30, 2008

(65) Prior Publication Data
US 2009/0036562 A1  Feb. 5, 2009

Related U.S. Application Data

(60) Continuation of application No. 10/922,399, filed on Aug. 20, 2004, now abandoned, which is a division of application No. 10/200,532, filed on Jul. 22, 2002, now Pat. No. 6,833,390.

(51) Int. Cl.
*C08G 18/28* (2006.01)
(52) U.S. Cl. ............ 521/174; 521/130; 521/137; 521/159; 521/170; 521/172; 521/173; 428/424.2; 428/424.7; 428/424.8; 428/425.8; 428/433
(58) Field of Classification Search ............ 521/130, 521/137, 159, 170, 172, 173, 174; 428/423.1, 428/424.2, 424.7, 424.8, 425.8, 433
See application file for complete search history.

(56) References Cited

U.S. PATENT DOCUMENTS

| 2,764,565 | A | | 9/1956 | Hoppe et al. |
|---|---|---|---|---|
| 3,304,273 | A | | 2/1967 | Stamberger |
| 3,383,351 | A | | 5/1968 | Stamberger |
| 3,523,093 | A | | 8/1970 | Stamberger |
| 3,652,639 | A | | 3/1972 | Pizzini et al. |
| 3,823,201 | A | | 7/1974 | Pizzini et al. |
| RE28,715 | E | | 2/1976 | Stamberger |
| RE29,118 | E | | 1/1977 | Stamberger |
| 4,042,537 | A | * | 8/1977 | Dahm et al. ............ 521/128 |
| 4,089,835 | A | | 5/1978 | Konig et al. |
| 4,104,236 | A | | 8/1978 | Simroth |
| 4,111,865 | A | | 9/1978 | Seefried, Jr. et al. |
| 4,119,586 | A | | 10/1978 | Shah |
| 4,125,505 | A | | 11/1978 | Critchfield et al. |
| 4,148,840 | A | | 4/1979 | Shah |
| 4,172,825 | A | | 10/1979 | Shook et al. |
| 4,260,530 | A | | 4/1981 | Reischl et al. |
| 4,374,209 | A | * | 2/1983 | Rowlands ............ 521/116 |
| 4,524,157 | A | | 6/1985 | Stamberger |
| 4,689,354 | A | | 8/1987 | Ramlow et al. |
| 5,013,766 | A | | 5/1991 | Hanusa |
| 5,070,115 | A | | 12/1991 | Welte et al. |
| 5,232,957 | A | | 8/1993 | Pritchard et al. |
| 5,552,450 | A | * | 9/1996 | Hinz et al. ............ 521/174 |
| 5,852,065 | A | | 12/1998 | Frey et al. |
| 6,046,249 | A | | 4/2000 | Tobias et al. |
| 6,127,443 | A | | 10/2000 | Perry et al. |
| 6,319,962 | B1 | | 11/2001 | Singh et al. |
| 6,833,390 | B2 | * | 12/2004 | Haider et al. ............ 521/130 |

FOREIGN PATENT DOCUMENTS

JP  4239516 AZ  8/1992

OTHER PUBLICATIONS

W.A. Kaplan, P.L. Neil, L.C. Staudte and C.J. Brink, Polyurethane Expo '96 Conference Proceedings, Las Vegas Nevada (month unavailable) 1996, pp. 179-188, "Low Density All Water-Blown Rigid Foam for Pour-in-Place Applications".

* cited by examiner

*Primary Examiner*—John Cooney
(74) *Attorney, Agent, or Firm*—N. Denise Brown; Noland J. Cheung

(57) ABSTRACT

The present invention is directed to a process for preparing water-blown rigid polyurethane foams having at least an 80% closed-cell content which involves reacting a) at least one polyol mixture which is composed of (i) at least one polymer polyol; (ii) at least one polyol having a hydroxyl value within the range of from about 200 to about 800; and (iii) optionally, at least one polyol having a hydroxyl value within the range of from about 25 to about 115; with b) at least one polymeric isocyanate and/or a prepolymer thereof; in the presence of c) optionally, at least one catalyst; d) water; and e) optionally, at least one additive or auxiliary agent. The present invention is also directed to the closed-cell water blown rigid polyurethane foams produced by the process of the present invention. The invention is further directed to a polyurethane-foam forming mixture which is used to produce the water-blown rigid polyurethane foams of the present invention. Foams produced according to the present invention have reduced friability and acceptable adhesion to substrates as well as acceptable compressive strength.

6 Claims, No Drawings

PROCESS FOR PREPARING CLOSED-CELL WATER-BLOWN RIGID POLYURETHANE FOAMS HAVING IMPROVED MECHANICAL PROPERTIES

CROSS-REFERENCE TO RELATED APPLICATIONS

This application is a continuation of U.S. application Ser. No. 10/922,399 which was filed on Aug. 20, 2004, now abandoned which was a divisional of U.S. application Ser. No. 10/200,532, filed on Jul. 22, 2002, now U.S. Pat. No. 6,833,390.

TECHNICAL FIELD OF THE INVENTION

The present invention relates to a process for preparing closed-cell water-blown rigid polyurethane foams which have reduced friability and acceptable adhesion to substrates and which also have acceptable compressive strength. The present invention is also directed to closed-cell water-blown rigid polyurethane foams produced by the process of the present invention. The invention is further directed to a polyurethane-foam forming mixture which is used to produce closed-cell water-blown rigid polyurethane foams which have reduced friability and acceptable adhesion to substrates and which also have acceptable compressive strength.

BACKGROUND OF THE INVENTION

Rigid polyurethane foams are widely known and are used in numerous industries. Rigid polyurethane foams are produced by reacting a polyisocyanate with a polyol in the presence of a blowing agent. Chlorofluorocarbons (CFC's) were typically used as blowing agents to produce rigid polyurethane foams which have excellent insulating properties. CFC's are now believed to contribute to the depletion of ozone in the stratosphere. As a result, mandates have been issued which prohibit the use of CFC's.

Hydrogen-containing chlorofluorocarbons (HCFC's), hydrofluorocarbon compounds (HFC's) and mixtures of HCFC's and HFC's are blowing agents considered to be acceptable alternatives to CFC's. HCFC 141b is currently used as an alternative to CFC's. However, due to the fact that the use of HCFC 141b will be phased-out beginning in 2003, effort has been directed to using water as a blowing agent in the production of some rigid polyurethane foams.

There are, however, drawbacks to using water as a blowing agent for producing rigid polyurethane foams. One such drawback is the fact that foams produced using relatively high levels of water as a blowing agent are friable and have relatively poor adhesion to substrates. See U.S. Pat. No. 5,013,766, column 1, lines 11-13.

A process for producing rigid polyurethane foams which are less brittle and which have acceptable adhesion to substrates has been investigated. For example, U.S. Pat. No. 5,013,766 describes a process for producing closed-cell rigid polyurethane foams which are less friable and adhere well to substrates. The process disclosed in this patent focuses on reacting an isocyanate with a polyol mixture in the presence of a catalyst, water, trichlorofluoromethane (Freon 11) and a foam stabilizer. However, from the examples contained in U.S. Pat. No. 5,013,766, one skilled in the art would recognize that foams produced by the process described in this patent would have low compressive strength.

Open-cell rigid polyurethane foams having acceptable compressive strength which are produced using polymer polyols are known. For example, U.S. Pat. No. 6,127,443 discloses a process for producing open-cell rigid energy absorbing polyurethane foams by reacting certain polymer polyols with an isocyanate in the presence of a blowing agent (water) to generate rigid polyurethane foams in which the total polymer solids content of the foam is in excess of about 15 weight percent. Foams produced by the process described in this patent are designed for energy management. Due to their open-cell structure, one skilled in the art would expect that the foams produced by the process described in U.S. Pat. No. 6,127,443 would have poor insulating properties. See W. A. Kaplan et al., *Low-Density All Water-Blown Rigid Foam for Pour-in-Place Applications*, Polyurethanes Expo '96 Conference Proceedings, pp. 179-89 (1996) wherein it states that, unlike closed-cell water blown polyurethane foams, open-cell polyurethane foams are poor insulators.

There therefore remains a need for closed-cell water-blown rigid polyurethane foams which have reduced friability and acceptable adhesion to substrates but which also have acceptable compressive strength.

SUMMARY OF THE INVENTION

The present invention relates to a process for preparing closed-cell water-blown rigid polyurethane foams which have reduced friability and acceptable adhesion to substrates and which also have acceptable compressive strength. The present invention also relates to closed-cell water-blown rigid polyurethane foams produced by the process of the present invention. The invention further relates to a polyurethane-foam forming mixture which is used to produce closed-cell water-blown rigid polyurethane foams which have reduced friability and acceptable adhesion to substrates and which also have acceptable compressive strength.

DESCRIPTION OF THE INVENTION

The present invention is directed to a process for preparing water-blown rigid polyurethane foams having at least an 80% closed-cell content which involves reacting a) at least one polyol mixture which is composed of i) at least one polymer polyol; ii) at least one polyol which has a hydroxyl value within the range of from about 200 to about 800; and iii) optionally, at least one polyol having a hydroxyl value within the range of from about 25 to about 115; with b) at least one polymeric isocyanate and/or a prepolymer thereof; in the presence of c) optionally, at least one catalyst; d) water; and e) optionally, at least one additive or auxiliary agent.

The present invention is also directed to the closed-cell water blown rigid polyurethane foams produced by the process of the present invention. The invention is further directed to a polyurethane-foam forming mixture which is used to produce water-blown rigid polyurethane foams having at least an 80% closed-cell content which is composed of a) at least one polyol mixture which is composed of i) at least one polymer polyol; ii) at least one polyol which has a hydroxyl value within the range of from about 200 to about 800; and iii) optionally, at least one polyol having a hydroxyl value within the range of from about 25 to about 115; b) at least one polymeric isocyanate and/or a prepolymer thereof; c) optionally, at least one catalyst; d) water; and e) optionally, at least one additive or auxiliary agent.

Any polymer polyol known in the art can be used as component i) in the polyol mixture of the present invention. Polymer polyols are dispersions of polymer solids in a polyol. Polymer polyols which are useful in the present invention include the "PHD" polymer polyols as well as the "SAN" polymer polyols.

SAN polymer polyols are typically prepared by the in situ polymerization of one or more vinyl monomers, preferably acrylonitrile and styrene, in a polyol, preferably, a polyether polyol, having a minor amount of natural or induced unsaturation. Methods for preparing SAN polymer polyols are described in, for example, U.S. Pat. Nos. 3,304,273; 3,383,351; 3,523,093; 3,652,639, 3,823,201; 4,104,236; 4,111,865; 4,119,586; 4,125,505; 4,148,840 and 4,172,825; 4,524,157; 4,690,956; Re-28715; and Re-29118.

SAN polymer polyols useful in the present invention typically have a polymer solids content within the range of from about 10 to about 60 wt. %, preferably, from about 30 to about 45 wt. %, based on the total weight of the SAN polymer polyol. As mentioned above, SAN polymer polyols are typically prepared by the in situ polymerization of a mixture of acrylonitrile and styrene in a polyol. When used, the ratio of styrene to acrylonitrile polymerized in situ in the polyol is typically in the range of from about 80:20 to about 0:100 parts by weight, based on the total weight of the styrene/acrylonitrile mixture. SAN polymer polyols useful in the present invention typically have hydroxyl values within the range of from about 15 to about 50, preferably, from about 20 to about 30.

Polyols used to prepare the SAN polymer polyols of the present invention are typically triols based on propylene oxide, or mixtures of propylene oxide and ethylene oxide. Alkoxylation of the starter can be accomplished by using either propylene oxide, a mixture of propylene oxide and ethylene oxide to form mixed block co-polymers, or by adding propylene oxide followed by ethylene oxide to form an ethylene oxide-capped polyol.

PHD polymer polyols are typically prepared by the in situ polymerization of an isocyanate mixture with a diamine and/or hydrazine in a polyol, preferably, a polyether polyol. Methods for preparing PHD polymer polyols are described in, for example, U.S. Pat. Nos. 4,089,835 and 4,260,530.

PHD polymer polyols useful in the present invention typically have a polymer solids content within the range of from about 10 to about 30 wt. %, preferably, from about 15 to about 25 wt. %, based on the total weight of the PHD polymer polyol. As mentioned above, PHD polymer polyols of the present invention are typically prepared by the in situ polymerization of an isocyanate mixture, typically, a mixture which is composed of about 80 parts by weight, based on the total weight of the isocyanate mixture, of 2,4-toluene diisocyanate and about 20 parts by weight, based on the total weight of the isocyanate mixture, of 2,6-toluene diisocyanate, with a diamine and/or hydrazine in a polyol, preferably, a polyether polyol.

PHD polymer polyols useful in the present invention typically have hydroxyl values within the range of from about 15 to about 40, preferably, from about 25 to about 35. Polyols used to prepare the PHD polymer polyols of the present invention are typically triols based on propylene oxide, ethylene oxide or mixtures thereof. Alkoxylation of the starter is preferably accomplished with propylene oxide, followed by a cap of ethylene oxide.

Any polyol known in the art which has a hydroxyl value within the range of from about 200 to about 800 can be used as component ii) in the polyol mixture of the present invention. Examples of polyols useful as component ii) include polyester polyols and polyether polyols having hydroxyl values within the range of from about 200 to about 800.

Polyester polyols useful as component ii) in the present invention typically have an average functionality within the range of from about 1.8 to about 8, preferably, from about 2 to about 6 and, more preferably, from about 2 to about 2.5; hydroxyl number values within the range of from about 200 to about 800 mg KOH/g, preferably, from about 200 to about 600 mg KOH/g.

Polyester polyols useful as component ii) in the polyol mixture of the present invention can be prepared by known procedures. Polyester polyols which are useful as component ii) in the present invention are typically obtained from polycarboxylic acids and polyhydric alcohols. Suitable polycarboxylic acids which can be used in the present invention include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-, β-diethylsuccinic acid, isophthalic acid, terephthalic acid, phthalic acid, hemimellitic acid and 1,4-cyclohexanedicarboxylic acid. Terephthalic acid is preferably used.

Suitable polyhydric alcohols which can be used to produce suitable polyester polyols used as component ii) in the present invention include ethylene glycol, propylene glycol, dipropylene glycol, trimethylene glycol, 1,2-butanediol, 1,4-butanediol, 1,5-pentanediol, 1,6-hexanediol, 1,7-heptanediol, hydroquinone, resorcinol, glycerine, 1,1,1-trimethylol-propane, 1,1,1-trimethylolethane, pentaerythritol, 1,2,6-hexanetriol, alpha.-methyl glucoside, sucrose and sorbitol. Ethylene glycol is preferably used.

Any polyether polyol known in the art having a hydroxyl value within the range of from about 200 to about 800 mg KOH/g can be used as component ii) of the polyol mixture of the present invention. Polyether polyols which are useful as component ii) in the present invention typically have an average functionality within the range of from about 1.8 to about 8, preferably, from about 2 to about 6 and, more preferably, from about 2 to about 3.0; hydroxyl number values within the range of from about 200 to about 800 mg KOH/g, preferably, from about 200 to about 600 mg KOH/g.

Polyether polyols which can be used as component ii) in the present invention can be prepared by known procedures such as by alkoxylating starter compounds. Any suitable alkylene oxide may be used such as ethylene oxide, propylene oxide, butylene oxide, amylene oxide and mixtures of these oxides. Preferably, propylene oxide is used. Starter compounds which can be used in the present invention include, for example, glycerine, trimethylolpropane, triethanolamine, ethanolamine, pentaerythritol, sucrose, sorbitol, propylene glycol, ethylene glycol, water and mixtures thereof. Preferably, glycerine is used.

Optionally, any polyol known in the art having a hydroxyl value within the range of from about 25 to about 115 mg KOH/g can be used as component iii) in the polyol mixture of the present invention. Polyether polyols which are useful as component iii) in the present invention typically have an average functionality within the range of from about 1.8 to about 3, preferably, from about 2 to about 3; hydroxyl number values within the range of from about 25 to about 115 mg KOH/g, preferably, from about 40 to about 70 mg KOH/g.

Polyether polyols which can be used as component iii) in the present invention can be prepared by known procedures such as by alkoxylating starter compounds. Any suitable alkylene oxide may be used such as ethylene oxide, propylene oxide, butylene oxide, amylene oxide and mixtures of these oxides. Preferably, mixtures of ethylene oxide and propylene oxide are used. Starter compounds which can be used in the present invention include, for example, glycerine, trimethylolpropane, triethanolamine, ethanolamine, propylene glycol, ethylene glycol, water and mixtures thereof. Preferably, mixtures of glycerine and propylene glycol are used.

The amount of polymer polyol present in the polyol mixture of the present invention is typically in the range of from about 10 to about 80 wt. %, preferably, from about 20 to about 60 wt. %, more preferably, from about 25 to about 40 wt. %, based on the total weight of the polyol mixture. The polyol mixture, catalyst (if used), water and additive or auxiliary agent (if used) are preferably combined to form an isocyanate-reactive mixture.

Optionally, any catalysts known in the art can be used in the present invention either alone or with one other catalyst or with multiple catalysts. Examples of catalysts which can be used in the present invention include, for example, tin(II) salts of carboxylic acids; dialkyl tin salts of carboxylic acids; dialkyl tin mercaptides; dialkyl tin dithioesters; bis-dimethylaminoethyl ethers; dimethyl benzylamines; tetramethylethylenediamine (TMEDA); dimethylaminodiglycols; dimethyldiglycolamines; sodium N-(2-hydroxy-5-nonyl phenyl) methyl-N-methylglycinate; and tertiary amines, such as, for example, dimethylcyclohexylamine.

Preferably, dimethyl benzylamine and tetramethylethylenediamine are both used as catalysts in the present invention. If used, catalysts can be present in an amount within the range of from about 0.1 to about 5% by weight each, preferably, within the range of from about 0.1 to about 2.0% by weight each, more preferably, within the range of from about 0.1 to about 1.5% by weight each, based on the total weight of the isocyanate-reactive mixture.

Water is used as the blowing agent in the present invention. Although it is preferred to use water as the sole blowing agent in the present invention, auxiliary blowing agents, such as, for example, carbon dioxide, can be used. Water can be used in an amount up to about 10% by weight. Preferably, about 1-8% by weight, more preferably, about 1-4% by weight, based on the total weight of the isocyanate-reactive mixture, of water is used in the present invention.

Optionally, any surfactants known in the art can be used in the present invention. Surfactants which can be used in the present invention include polyether siloxanes. The structure of these compounds is generally such that a copolymer of ethylene oxide and propylene oxide is attached to a polydimethyl siloxane radical. Such foam stabilizers are described in, for example, U.S. Pat. No. 2,764,565.

Preferably, silicon surfactants suitable for rigid polyurethane foams are used in the present invention. Surfactants can be used in the present invention in amounts of from about 0.3 to about 3% by weight, preferably, in amounts of from about 0.5 to about 2% by weight, based on the total weight of the isocyanate-reactive mixture. TEGOSTAB B 8421, which is available commercially from Goldschmidt AG, Essen, Germany, is an example of a surfactant which can be used in the present invention.

In addition to surface-active agents, other known additives can be used in the present invention, including, for example, internal mold release agents; pigments; cell regulators; flame retarding agents; plasticizers; dyes; and fillers, all of which are known in the art. Known reinforcing agents such as, for example, glass in the form of fibers or flakes or carbon fibers can also be used.

Any polymeric isocyanates and/or prepolymers thereof can be used in the present invention. Preferably, polymeric isocyanates and/or prepolymers thereof which are used in the present invention include, for example, polymeric diphenylmethane diisocyanates having an NCO group content within the range of from about 25 to about 33%, an average functionality within the range of from about 2.5 to about 3.0 and a viscosity within the range of from about 50 to about 1,000, preferably, from about 150 to about 800 mPa·s at 25° C.

Polymeric isocyanates and/or prepolymers thereof useful in the present invention are typically used in an amount such that the isocyanate index is within the range of from about 100 to about 150, preferably, within the range of from about 120 to about 140. The term "Isocyanate Index" (also commonly referred to as "NCO index"), is defined herein as the quotient of the number of equivalents of isocyanate divided by the total equivalents of isocyanate-reactive hydrogen containing materials, multiplied by 100. When water is present as the blowing agent, the quantity of water present is considered in calculating the isocyanate index.

The present invention is also directed to closed-cell water-blown rigid polyurethane foams produced according to the present invention. Closed-cell water-blown rigid polyurethane foams of the present invention have reduced friability and acceptable adhesion to substrates and relatively high compressive strength. Solids from the polymer polyol are typically present in the closed-cell water-blown rigid polyurethane foams produced according to the present invention in an amount from about 1 to about 30 wt. %, based on the total weight of the foam.

The compressive strength of the closed-cell water-blown rigid polyurethane foams produced according to the present invention is typically in the range of from about 35 to about 150 $lb/in^2$. Foams produced according to the present invention have acceptable insulating properties. For insulating foams, the object is to retain the blowing agent in the cells to maintain a low k-factor. "K-factor" is a measurement of the thermal conductivity of the insulating material, i.e., the rigid polyurethane foam. Thus, less open-cell content in the foam is desirable. Foams produced according to the present invention typically have more than an 80% closed-cell content.

Foams produced according the invention have acceptable adhesion to substrates. The adhesive properties of water-blown rigid polyurethane foams are determined by measuring tensile adhesion strength of the foam to a desired substrate. ASTM D-1623 is an acceptable standard for measuring tensile adhesion of water-blown rigid polyurethane foams. Preferably, water-blown rigid polyurethane foams produced according to the present invention have a tensile adhesion strength greater than 60 $lbs/in^2$ as measured by ASTM D-1623 when adhered to an aluminum or to an acrylonitrile/butadiene/styrene (ABS) substrate.

Foams produced according to the present invention are particularly useful in applications such as, for example, foam-filling items such as picnic coolers, vending machines, entry or garage doors, water heaters, flotation devices and sandwich composites for trailer side-walls (non-refrigerated).

The following examples merely illustrate the invention. Those skilled in the art will recognize many variations that are within the spirit of the invention and scope of the claims.

EXAMPLES

The following compounds were used in the examples:

Polyol A: a polyether polyol having an OH number of about 56 prepared by KOH-catalyzed alkoxylation of a mixture of gycerine:propylene glycol (88:12 pbw) with a block of propylene oxide (30 wt. % of the total oxide), followed by a mixed block of propylene oxide (40 wt. % of the total oxide) and ethylene oxide (10 wt. % of the total oxide) and finished with a block of propylene oxide (20 wt. % of the total oxide);

Polyol B: a polyether polyol having an OH number of about 470 prepared by KOH-catalyzed alkoxylation of glycerine with propylene oxide;

Polyol C: a polyether polyol having an OH number of about 56 prepared by zinc hexacyanocobaltate-catalyzed alkoxylation of a mixture of glycerine:propylene glycol (86:14 pbw) with a mixed block of propylene oxide (93 wt. %) and ethylene oxide (7 wt. %);

Polyol D: a modified diethylene glycol phthalate polyester polyol having an OH value of from about 230 to about 250 which is commercially available as STEPANPOL PS 2502 A from Stepan Company, Northfield, Ill.;

Polymer Polyol A: a 20 weight % solids polymer polyol having an OH number of about 29, in which the solids are the reaction product of an 80:20 pbw mixture of 2,4- and 2,6-toluene diisocyanate and hydrazine polymerized in situ in a base polyol which is a KOH-catalyzed glycerine initiated propylene oxide triol with a 17 wt. % ethylene oxide cap, having an OH number of about 35;

Polymer Polyol B: a 45 weight % solids polymer polyol having an OH number of about 28 in which the solids are a styrene/acrylonitrile (63:37 pbw) mixture polymerized in situ in a base polyol which is a KOH-catalyzed glycerine initiated propylene oxide/ethylene oxide (87.5:12.5 pbw) triol having an OH number of about 53;

Polymer Polyol C: 43 weight % solids polymer polyol having an OH number of about 20 in which the solids are a styrene/acrylonitrile (63:37 pbw) mixture polymerized in situ in a base polyol which is a KOH-catalyzed glycerine initiated propylene oxide triol with a 20 wt. % ethylene oxide cap, having an OH number of about 36;

Catalyst A: dimethyl benzylamine;

Catalyst B: tetramethylethylene diamine;

Surfactant A: TEGOSTAB B 8421, which is available commercially from Goldschmidt AG, Essen, Germany;

Isocyanate A: a polymeric diphenylmethane diisocyanate having an NCO group content of about 31.5%, a functionality of about 2.8 and a viscosity of about 200 mPa·s at 25° C.; and Isocyanate B: an isocyanate terminated prepolymer prepared from Isocyanate A and Polyol D having an NCO content of about 29.4%, a molecular weight of about 400 g/mole and a functionality of about 2.8.

For each of the Examples 1-5, a 14"×14"×1" clamped aluminum mold was heated to 40° C. The polyol, polymer polyol (if present), water, surfactant and catalyst were hand-mixed to form an isocyanate-reactive mixture. The isocyanate as well as the isocyanate-reactive mixture were allowed to equilibrate to 20° C. The isocyanate-reactive mixture was combined with the isocyanate and mixed with a conventional motor-driven stirrer at 2800 rpm for ten seconds. The reactive mixture was then poured into the aluminum mold. The mold was first left open at the top and over-filled to determine minimum fill density by cutting the sample down to known dimensions and determining the mass. After the minimum fill density was determined, the mold was clamped closed and packed to a density of 15% over the minimum fill density. The foam was sandwiched between one galvanized aluminum facer and one aluminum facer. The facers were fixed in the mold during foaming using vinyl tape to prevent foam from flowing between the facers and the mold surface. Foams were held in the clamped fixture at 40° C. for 20 minutes before de-molding. The formulations used in Examples 1-5 are set forth in Table 1. The mechanical properties of the foams produced using the formulations of Examples 1-5 are set forth in Table 2.

As illustrated in Table 2, the foams produced with the formulations of Examples 1-4 had relatively high compressive strength and tensile adhesion. Also, as illustrated in Table 2, the formulation of Example 5 (a comparative example), which did not contain polymer polyol, produced a foam which had a relatively low compressive strength compared to the foams of relatively the same density produced with the polymer polyol-containing formulations of Examples 14.

For each of the Examples 6-7, a 14"×14"×2" clamped aluminum mold was heated to 40° C. The polyol, polymer polyol (if present), water, surfactant and catalyst were hand-mixed to form an isocyanate-reactive mixture. The isocyanate as well as the isocyanate-reactive mixture were allowed to equilibrate to 20° C. The isocyanate-reactive mixture was combined with the isocyanate and mixed with a conventional motor-driven stirrer at 2800 rpm for ten seconds. The reactive mixture was then poured into the aluminum mold. The mold was first left open at the top and over-filled to determine minimum fill density by cutting the sample down to known dimensions and determining the mass. After the minimum fill density was determined, the mold was clamped closed and packed to a density of 15% over the minimum fill density. The foam was sandwiched between two ABS facers. The ABS facers were fixed in the mold during foaming using vinyl tape to prevent foam from flowing between the facers and the mold surface. Foams were held in the clamped fixture at 40° C. for 20 minutes before de-molding. The formulations used in Examples 6-7 are set forth in Table 3. The mechanical properties of the foams produced using the formulations of Examples 6-7 are set forth in Table 4.

As illustrated in Table 4, the foam produced according to the formulation of Example 6 had relatively high compressive strength and tensile adhesion. Also, as illustrated in Table 4, the formulation of Example 7 (a comparative example), which did not contain polymer polyol, produced a foam which had a low compressive strength compared to the foam of relatively the same density produced with the polymer polyol-containing formulation of Example 6.

The foams produced in the foregoing examples were tested according to the following test methods:

Molded Density: ASTM D-1622
Compressive Strength: ASTM D-1621
Tensile Adhesion: ASTM D-1623 (Type C specimen)

TABLE 1

| Example | 1 | 2 | 3 | 4 | 5* |
|---|---|---|---|---|---|
| Polyol B | 37.6 g | 37.6 g | 37.6 g | 37.6 g | 37.6 g |
| Polyol C | | | | 28.2 g | 56.4 g |
| Polymer Polyol A | | | 56.4 g | | |
| Polymer Polyol B | 56.4 g | | | 28.2 g | |
| Polymer Polyol C | | 56.4 g | | | |
| Catalyst A | 1.40 g | 1.40 g | 1.40 g | 1.40 g | 1.40 g |
| Catalyst B | 0.14 g | 0.14 g | 0.14 g | 0.14 g | 0.14 g |
| Surfactant A | 1.44 g | 1.44 g | 1.44 g | 1.44 g | 1.44 g |
| Water | 2.5 g | 2.5 g | 2.5 g | 2.5 g | 2.5 g |
| Isocyanate A | 110.8 g | 109.4 g | 111.0 g | 113.3 g | 115.8 g |

*Comparative Example

TABLE 2

| Example | 1 | 2 | 3 | 4 | 5* |
|---|---|---|---|---|---|
| Density (lbs/ft$^3$) | 5.70 | 5.66 | 5.73 | 5.75 | 5.69 |
| Compressive strength (perpendicular) (lbs/in$^2$) | 86 | 84 | 69 | 79 | 62 |
| Tensile Adhesion (lbs/in$^2$) | 126 | 123 | 109 | 121 | 105 |

TABLE 2-continued

| Example | 1 | 2 | 3 | 4 | 5* |
|---|---|---|---|---|---|
| Closed-cell (%) | 85 | 86 | 84 | 84 | 84 |
| Solids in foam (wt. %) | 12.1 | 11.6 | 5.4 | 6.0 | 0 |

*Comparative Example

TABLE 3

| Example | 6 | 7* |
|---|---|---|
| Polyol A | | 56.4 g |
| Polyol B | 37.6 g | 37.6 g |
| Polymer Polyol B | 56.4 g | |
| Catalyst A | 1.40 g | 1.40 g |
| Catalyst B | 0.14 g | 0.14 g |
| Surfactant A | 1.44 g | 1.44 g |
| Water | 3.0 g | 3.0 g |
| Isocyanate B | 131.9 g | 137.2 g |

*Comparative Example

TABLE 4

| Example | 6 | 7* |
|---|---|---|
| Density (lbs/ft$^3$) | 3.23 | 3.28 |
| Compressive strength (perpendicular) (lbs/in$^2$) | 44 | 24 |
| Tensile Adhesion (lbs/in$^2$) | 73 | 75 |
| Closed-cell (%) | 86 | 84 |
| Solids in foam (wt. %) | 10.9 | 0 |

*Comparative Example

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid polyurethane foam composite comprising
   (1) a rigid polyurethane foam having at least an 80% closed-cell content and comprising the reaction product of:
      (a) at least one polyol mixture comprising:
         (i) at least one polymer polyol,
         (ii) at least one polyol having a hydroxyl value within the range of from about 200 to about 800, and
         (iii) optionally, at least one polyol having a hydroxyl value within the range of from about 25 to about 115;
      with
      (b) at least one polymeric isocyanate and/or a prepolymer thereof,
      in the presence of
      (c) optionally, at least one catalyst,
      (d) water,
      and
      (e) optionally, at least one additive or auxiliary agent,
      wherein the foam has a perpendicular compressive strength within the range of from about 35 to about 150 lbs/in$^2$ and a tensile adhesion greater than about 105 lbs/in$^2$,
   and
   (2) one or more facer substrates,
   in which said rigid polyurethane foam is adhered to said one or more facer substrates.

2. The rigid polyurethane foam composite of claim 1, comprising (2) two facer substrates, with (1) said rigid polyurethane foam being sandwiched between the two facer substrates.

3. The rigid polyurethane foam composition of claim 1, in which (2) said facer substrates are selected from the group consisting of aluminum substrates and acrylonitrile/butadiene/styrene (ABS) substrates.

4. A process for preparing a rigid polyurethane foam composite comprising
   (I) applying a rigid polyurethane foam forming reaction mixture to the surface of one or more facer substrates, wherein said rigid polyurethane foam forming reaction mixture comprising the reaction product of:
      (a) at least one polyol mixture comprising:
         (i) at least one polymer polyol,
         (ii) at least one polyol having a hydroxyl value within the range of from about 200 to about 800, and
         (iii) optionally, at least one polyol having a hydroxyl value within the range of from about 25 to about 115;
      with
      (b) at least one polymeric isocyanate and/or a prepolymer thereof,
      in the presence of
      (c) optionally, at least one catalyst,
      (d) water,
      and
      (e) optionally, at least one additive or auxiliary agent,
   and
   (II) allowing the rigid polyurethane foam forming reaction mixture to cure, thereby forming a rigid foam having at least an 80% closed cell content, a perpendicular compressive strength within the range of from about 35 to about 150 lbs/in$^2$ and a tensile adhesion greater than about 105 lbs/in$^2$.

5. The process of claim 4, additionally comprising placing a second facer substrate onto the exposed surface of the rigid polyurethane foam forming reaction mixture prior to curing.

6. The process of claim 4, in which said one or more facer substrates are selected from the group consisting of aluminum substrates and acrylonitrile/butadiene/styrene (ABS) substrates.

* * * * *